US005725676A

United States Patent [19]

Chiu et al.

[11] Patent Number: 5,725,676
[45] Date of Patent: Mar. 10, 1998

[54] THERMALLY INHIBITED STARCHES AND FLOURS AND PROCESS FOR THEIR PRODUCTION

[75] Inventors: Chung-Wai Chiu, Westfield; Eleanor Schiermeyer, Bound Brook; David J. Thomas, Flemington; Manish B. Shah, Somerset, all of N.J.

[73] Assignee: National Starch and Chemical Investment Holding Corporation, Wilmington, Del.

[21] Appl. No.: 374,279

[22] Filed: Jan. 18, 1995

Related U.S. Application Data

[63] Continuation-in-part of Ser. No. 296,211, filed as PCT/US94/08559, Jul. 29, 1994, which is a continuation-in-part of Ser. No. 99,753, Jul. 30, 1993, abandoned.

[51] Int. Cl.$^6$ .................................................. C08B 30/00
[52] U.S. Cl. ............................... 127/34; 127/69; 127/70; 127/71
[58] Field of Search .................................. 127/69, 70, 71, 127/34

[56] References Cited

U.S. PATENT DOCUMENTS

| | | | |
|---|---|---|---|
| 2,661,349 | 2/1953 | Caldwell et al. | 260/224 |
| 3,967,975 | 7/1976 | Idaszak | 127/23 |
| 3,977,897 | 8/1976 | Wurzburg et al. | 127/71 |
| 4,013,799 | 3/1977 | Smalligan et al. | 426/578 |
| 4,256,509 | 3/1981 | Tuschhoff et al. | 127/32 |
| 4,266,348 | 5/1981 | Ledding | 34/10 |
| 4,280,851 | 7/1981 | Pitchon et al. | 127/33 |
| 4,303,451 | 12/1981 | Seidel et al. | 127/32 |
| 4,303,452 | 12/1981 | Ohira et al. | 127/32 |
| 4,391,836 | 7/1983 | Chiu | 426/578 |
| 4,428,972 | 1/1984 | Wurzburg et al. | 426/578 |
| 4,465,702 | 8/1984 | Eastman et al. | 426/578 |
| 4,600,472 | 7/1986 | Pitchon et al. | 159/4.4 |
| 4,610,760 | 9/1986 | Kirkpatrick et al. | 159/4.01 |
| 4,847,371 | 7/1989 | Schara et al. | 536/111 |
| 5,037,929 | 8/1991 | Rajagopalan et al. | 426/578 |
| 5,149,799 | 9/1992 | Rubens | 536/102 |

FOREIGN PATENT DOCUMENTS

| | | | |
|---|---|---|---|
| 1 150 934 | 8/1983 | Canada | 23/431 |
| 0 321 216 A2 | 12/1988 | European Pat. Off. | C08B 34/00 |
| 60-97331 | 5/1985 | Japan | C08B 30/12 |
| 263897 | 12/1926 | United Kingdom | A21D 6/00 |
| 530226 | 12/1940 | United Kingdom | 127/71 |
| 595552 | 12/1947 | United Kingdom | C08B 30/12 |

OTHER PUBLICATIONS

Louis Sair, "Heat–Moisture Treatment", *Methods in Carbohydrate Chemistry*, vol. IV Starch, Academic Press, 1964 month N/A.
Whistler, Bemiller, Paschall, "Starch: Chemistry and Technology" Academic Press, 1984 month N/A.
L. Sair and W. R. Fetzer, "Water Sorption by Starches" *Industrial and Engineering Chemistry*, vol. 36, No. 3, pp. 205–208 month N/A.
Dong–Hyun Lee and Sang–Done Kim, "Drying Characteristics of Starch in an Inert Medium Fluidized Bed", Chem. Eng. Technol. 16 (1993) pp. 263–269 1993 (month N/A).
"The bepex Fluid Bed" (Bulletin) month N/A.
Cristina Ferrero, Miriam Nora Martino and Noemi Elisabet Zaritzky, "Stability of Frozen Starch Pastes: Effect of Freezing, Storage and Xanthan Gum Addition", Journal of Food Processing and Preservation 17 (1993) pp. 191–211 Apr. 1993.

*Primary Examiner*—Glenn Caldarola
*Assistant Examiner*—Patricia L. Hailey
*Attorney, Agent, or Firm*—Margaret B. Kelley

[57] ABSTRACT

Thermally inhibited starches and flours are prepared by a process comprising dehydrating and heat treating a granular starch or flour.

6 Claims, No Drawings

THERMALLY INHIBITED STARCHES AND FLOURS AND PROCESS FOR THEIR PRODUCTION

This application is a continuation-in-part of Ser. No. 08/296,211 filed 25 Aug. 1994 and PCT Ser. No. US94/ 08559 filed 29 Jul. 1994, which are continuations-in-part of Ser. No. 08/099,753, filed 30 Jul. 1993, now abandoned.

FIELD OF THE INVENTION

This invention relates to starches and flours that are thermally inhibited and to a process for their preparation. The thermally inhibited starches and flours may be used in place of chemically crosslinked starches and flours presently used in foods and in the manufacture of industrial products.

BACKGROUND OF THE INVENTION

Prior art has taught that starches can be heated for various purposes, such as, drying, vaporizing off-flavors, imparting a smokey taste, or dextrinizing, as shown by the following references.

U.S. Pat. No. 4,303,451, issued Dec. 1, 1981, to Seidel, et al. discloses heating waxy maize starch at a temperature within the range of 120° to 200° C. at its naturally occurring pH to remove woody flavors and to modify the texture on pregelatinization.

Japanese Patent Publication No. 61-254602, dated Dec. 11, 1986, discloses heating waxy maize starch and waxy maize starch derivatives at a temperature from 100° to 200° C. to provide a starch with emulsification properties to replace gum arabic. In this process, the starch is heated in the presence of moisture, preferably under acidic conditions of pH 4.0–5.0, to hydrolyze the starch to obtain the emulsification properties.

U.S. Pat. No. 4,303,452 discloses smoke treatment of waxy maize starch to improve gel strength and impart a smokey taste. In order to counteract the acidity of the smoke and to obtain a final starch product with a pH of 4 to 7, the pH of the starch is raised to a range of 9–11 before smoking. The preferred water content of the starch during the smoking is 10–20%.

Although these references disclose that starches are heated for various purposes, they do not disclose the use of heat to make an inhibited starch or how to make a starch that is inhibited without the use of chemical reagents.

When native starch granules are dispersed in water and heated, they become hydrated and swell at about 60° C., and reach a peak viscosity through the 65°–95° C. range. This increase in viscosity is a desired property in many food and industrial applications and results from the physical force or friction between the highly swollen granules. Swollen, hydrated starch granules, however, are quite fragile. As the starch slurry is held at temperatures of 92°–95° C., the starch granules begin to fragment and the viscosity breaks down. Shear or conditions of extreme pH also tend to disrupt and fragment the granules, so that the starch polymers dissociate and become solubilized, leading to a rapid breakdown from the initially high viscosity.

It has been known that both the swelling of the starch granules and the breakdown in viscosity can be inhibited by treating the starch with chemical reagents that introduce intermolecular bridges or crosslinks between the starch molecules. The crosslinks reinforce the associative hydrogen bonds holding the granules together, restrict the swelling of the starch granules, and consequently inhibit disruption and fragmentation of the granules. Because of this inhibition, crosslinked starches are also called inhibited starches.

Because chemically crosslinked starches are used in many applications where a stable-viscosity starch paste is needed, it would be an advantage in cost, time, and in the reduction of the use of chemicals, if native or modified starch could be inhibited to perform the same as chemically crosslinked starch without the use of chemicals.

SUMMARY OF THE INVENTION

The starches and flours of this invention are thermally inhibited in a process that results in the starch or flour having the characteristics of a chemically crosslinked starch, without the addition of chemical reagents. When these thermally inhibited starches and flours are dispersed at 5–6.3% anhydrous solids in water at 92°–95° C. and pH 3, they exhibit the properties characteristic of an inhibited starch, namely: the starches and flours that are substantially completely inhibited will resist gelatinization; the starches and flours that are highly inhibited will gelatinize to a limited extent and show a continuing rise in viscosity, but will not attain a peak viscosity; the starches and flours that are moderately inhibited will exhibit a lower peak viscosity and a lower percentage breakdown in viscosity compared to the same starch that is not inhibited; and the starches and flours that are lightly inhibited will show a slight increase in peak viscosity, and a lower percentage breakdown in viscosity compared to control starch.

In general, the thermal inhibition process comprises the steps of dehydrating a granular starch or flour until it is anhydrous or substantially anhydrous, which for purposes herein means containing less than 1% moisture by weight, and then heat treating the anhydrous or substantially anhydrous starch or flour at a temperature and for a period of time effective to cause inhibition. Both the dehydrating and heat treating steps are conducted under conditions to avoid degradation or hydrolysis of the starch or flour.

The starch or flour can be dehydrated and heated either at its naturally occurring pH, which typically is in the range of pH 5.0 to pH 6.5, or the pH of the starch or flour first can be raised to neutral or greater. As used herein, neutral covers the range of pH values around pH 7 and is meant to include from about pH 6.5 to about pH 7.5.

Preferably, the process comprises the steps of raising the pH of the starch to neutral or greater, dehydrating the starch to anhydrous or substantially anhydrous, and heat treating the anhydrous or substantially anhydrous starch at a temperature of 100° C. or greater for a period of time effective to provide the inhibited starch.

By varying the process conditions, including the initial pH of the starch or flour, the dehydrating and heat treating temperatures, and the heat treating times, the level of inhibition can be varied to provide different viscosity characteristics in the starch or flour. Inasmuch as the dehydrating and heat treating process parameters can be a function of the particular apparatus used for dehydrating and heat treating, the choice of apparatus will also be a factor in the control of the level of inhibition.

In one embodiment, the dehydrating and heat treating steps occur simultaneously. The process steps may be carried out as part of a continuous process including the extraction of the starch or flour from a plant material.

DETAILED DESCRIPTION OF THE INVENTION

The thermally inhibited starches and flours of this invention are granular and can be derived from any native source.

The native source can be banana, corn, pea, potato, sweet potato, barley, wheat, rice, sago, amaranth, tapioca, sorghum, waxy maize, waxy rice, waxy barley, waxy potato, waxy sorghum, starches containing high amylose, and the like. The preferred starches are the waxy starches, including waxy maize, waxy rice, waxy potato, waxy sorghum and waxy barley. Unless specifically distinguished, references to starch in this description are meant to include their corresponding flours. References to starch are also meant to include starch containing protein, whether the protein is endogenous protein, or added protein from an animal or plant source, such as, zein, albumin, and soy protein.

As used herein, a native starch is one as it is found in nature. The starches may be native starches, or the starches may be modified by enzymes, heat or acid conversion, oxidation, phosphorylation, etherification (particularly, hydroxyalkylation), esterification, and chemical crosslinking.

In the first step of the process to achieve thermal inhibition, the starch is dehydrated for a time and at a temperature sufficient to render the starch anhydrous or substantially anhydrous. In the second step, the anhydrous or substantially anhydrous starch is heat treated for a time and at a temperature sufficient to inhibit the starch.

When starches are subjected to heat in the presence of water, acid hydrolysis or degradation of the starch can occur. Hydrolysis or degradation will impede or prevent inhibition; therefore, the conditions for the dehydration of the starch need to be chosen so that inhibition is favored over hydrolysis or degradation. Although, any conditions meeting that criteria can be used, suitable conditions consist in dehydrating at low temperatures, or raising the pH of the starch before dehydrating. The preferred conditions consist in a combination of low temperature and neutral to basic pH.

Preferably, the temperatures to dehydrate the starch are kept at 125° C. or lower, and more preferably at temperatures, or a range of temperatures, between 100° to 120° C. The dehydrating temperature can be lower than 100° C., but a temperature of at least 100° C. will be more effective in removing moisture.

The preferred pH is at least 7, typically the ranges are pH 7.5 to 10.5, preferably 8 to 9.5, and most preferably greater than pH 8. At a pH above 12, gelatinization more easily occurs; therefore, pH adjustments below 12 are more effective.

To adjust the pH, the granular starch is slurried in water or other aqueous medium, typically in a ratio of 1.5 to 2.0 parts water to 1.0 part starch, and the pH raised by the addition of any suitable base. Buffers, such as sodium phosphate, may be used to maintain pH if needed. The starch slurry is then either dewatered and dried, or dried directly, preferably to 2–6% moisture content. These drying procedures are to be distinguished from the thermal inhibition process steps in which the starch is dehydrated to anhydrous. Alternatively, a solution of a base may be sprayed onto the powdered starch until the starch attains the desired pH, or an alkaline gas, such as $NH_3$, can be infused into the starch.

For food applications, suitable food grade bases for use in the pH adjustment step include, but are not limited to, sodium hydroxide, sodium carbonate, tetrasodium pyrophosphate, ammonium orthophosphate, disodium orthophosphate, trisodium phosphate, calcium carbonate, calcium hydroxide, potassium carbonate, and potassium hydroxide, and may include any other base approved for food use under Food and Drug Administration laws or other food regulatory laws. Bases not approved for food use under these regulations may also be used, provided they can be washed from the starch so that the final product conforms to good manufacturing practices for food use. The preferred food grade base is sodium carbonate. It may be noted that the textural and viscosity benefits of the thermal inhibition process tend to be enhanced as the pH is increased, although higher pHs tend to increase browning of the starch during the heat treating step.

If the starch is not going to be used for food, any workable or suitable inorganic or organic base that can raise the pH of starch may be used.

After it is dehydrated, the starch is heat treated for a time and at a temperature, or a range of temperatures, effective to inhibit the starch. The preferred heating ranges are temperatures or a range of temperatures greater than 100° C. For practical purposes, the upper limit of the heat treating temperature is usually in the range of 200° C., at which temperature highly inhibited starches can be obtained. Typically the heat treating is carried out at 120°–180° C., preferably 140°–160°, more preferably 160° C. The time and temperature profile will depend on the level of inhibition desired.

For most industrial applications, the dehydrating and heat treating steps will be continuous and be accomplished by the application of heat to the starch beginning from ambient temperature. In the majority of cases, the moisture will be driven off and the starch will be anhydrous or substantially anhydrous before the temperature reaches about 125° C. After the starch reaches an anhydrous or substantially anhydrous state, and heating is continued, some level of inhibition will be attained simultaneously, or even before, the final heat treating temperature is reached. Usually, at these initial levels of inhibition, the peak viscosities are higher than at inhibition levels reached with longer heat treating times, although there will be greater breakdown in viscosity from the peak viscosity. With continued heat treating, the peak viscosities are lower, but the breakdowns in viscosities are less.

If moisture is present during the heat treating step, and particularly if the heat treating step will be performed at elevated temperatures, the pH is adjusted to greater than pH 8 to achieve inhibition.

The source of the starch, the dehydrating conditions, the heating time and temperature, the initial pH, and whether or not moisture is present during the process steps, are all variables that affect the amount of inhibition that can be obtained. All these factors are interrelated and an examination of the examples will show the effect the different variables have on controlling the level of inhibition and the textural and viscosity characteristics of the inhibited products.

The starches may be inhibited individually, or more than one may be inhibited at the same time. The starches may be inhibited in the presence of other materials or ingredients that would not interfere with the thermal inhibition process or alter the properties of the starch product.

The process steps may be performed at normal pressures, under vacuum or under pressure, and may be accomplished using any means known to practitioners, although the preferred method is by the application of dry heat in air or in an inert gaseous environment.

Following the heat treating step, the starch may be screened to select a desirable particle size, slurried in water and washed, filtered, and dried, or otherwise refined. The pH may be adjusted as desired. In particular, the pH may be readjusted to the naturally occurring pH of the starch. The thermally inhibited starches may also be pregelatinized to disrupt the granules after the thermal inhibition steps.

The thermal inhibition process may be employed in conjunction with other starch reactions used to modify starch for commercial applications, such as, heat or acid conversion, oxidation, phosphorylation, etherification (particularly, hydroxyalkylation), esterification, and chemical crosslinking. Usually these modifications are performed before the starch is thermally inhibited, but they may be performed after.

The dehydrating and heat treating apparatus can be any industrial oven, for example, conventional ovens, microwave ovens, dextrinizers, fluidized bed reactors and driers, mixers and blenders equipped with heating devices and other types of heaters, provided that the apparatus is fitted with a vent to the atmosphere so that moisture does not accumulate and precipitate onto the starch. Preferably, the apparatus is equipped with a means for removing water vapor from the apparatus, such as, a vacuum or a blower to sweep air from the head-space of the apparatus, or a fluidizing gas. The heat treating step can be accomplished in the same apparatus in which the dehydrating step occurs, and most conveniently is continuous with the dehydrating step. When the dehydrating step is continuous with the heat treating step, and particularly when the dehydrating and heat treating apparatus is a fluidized bed reactor or drier, the dehydrating step occurs simultaneously while bringing the equipment up to the final heat treating temperature.

Superior thermally inhibited starches having high viscosities with no or low percentage breakdown in viscosity are obtained in shorter times in the fluidized bed reactor than can be achieved using other conventional heating ovens. Suitable fluidizing gases are air and nitrogen. For safety reasons, it is preferable to use a gas containing less than 12% oxygen.

Conventional ovens can be used to provide good thermally inhibited products acceptable for a wide variety of uses. The temperature of the apparatus should be adjusted to between 120° and 180° C., preferably 140° to 160° C., and most preferably about 160° C. in order to obtain the thermally inhibited starch product. At a temperature of 160° C., the heating step is preferably carried out for 3.5 to 4.5 hours. Depending upon the precise temperature selected, the batch size, the pH, the selection of starch or flour used, and other factors, the heating process may be carried out from about 1 to 20 hours.

In one specific embodiment, a noncohesive heat-stable starch can be made by a process in which a native granular starch, with a moisture content of 0–12% by weight is adjusted to a pH of greater than 8.0 by adding a base, and then heated at 120°–180° for 1–20 hours. As previously discussed, moisture is driven off during this heating, and the heat treating step is performed on an anhydrous or substantially anhydrous starch or flour. On an industrial scale using a conventional oven, heating for 4 to 5 hours may be required to equilibrate the starch temperature to 160° C. prior to carrying out the heating step.

Characterization of Inhibition by Texture

Starches or flours with a low to moderate degree of inhibition will exhibit certain textural characteristics when dispersed in an aqueous medium and heated to gelatinization. In the following examples, the samples were determined to be inhibited if a heated gelatinized slurry of the sample exhibited a noncohesive, smooth texture.

Characterization of Inhibition by Brabender Data

Characterization of a thermally inhibited starch is made more conclusively by reference to a measurement of its viscosity after it is dispersed in water and gelatinized. The instrument used to measure the viscosity is a Brabender VISCO/Amylo/GRAPH, (manufactured by C. W. Brabender Instruments, Inc., Hackensack, N.J.). The VISCO/Amylo/GRAPH records the torque required to balance the viscosity that develops when a starch slurry is subjected to a programmed heating cycle. For noninhibited starches, the cycle passes through the initiation of viscosity, usually at about 60°–70° C., the development of a peak viscosity in the range of 65°–95° C., and any breakdown in viscosity when the starch is held at the elevated temperature, usually 92°–95° C. The record consists of a curve tracing the viscosity through the heating cycle in arbitrary units of measurement termed Brabender Units (BU).

Inhibited starches will show a Brabender curve different from the curve of the same starch that has not been inhibited (hereinafter the control starch). At low levels of inhibition, an inhibited starch will attain a peak viscosity somewhat higher than the peak viscosity of the control, and there may be no decrease in percentage breakdown in viscosity compared to the control. As the amount of inhibition increases, the peak viscosity and the breakdown in viscosity decrease. At high levels of inhibition, the rate of gelatinization and swelling of the granules decreases, the peak viscosity disappears, and with prolonged cooking the Brabender trace becomes a rising curve indicating a slow continuing increase in viscosity. At very high levels of inhibition, starch granules no longer gelatinize, and the Brabender curve remains flat.

Sample Preparation

All the starches and flours used were granular and except where indicated, were provided by National Starch and Chemical Company of Bridge-water, N.J.

The controls for the test samples were from the same native sources as the test samples, were unmodified or modified as the test samples, and were at the same pH, unless otherwise indicated.

All starches and flours, both test and control samples, were prepared and tested individually.

The pH of the samples was raised by slurrying the starch or flour in water at 30–40% solids and adding a sufficient amount of a 5% sodium carbonate solution until the desired pH was reached.

All samples were spray dried or flash dried as conventional in the art (without gelatinization) to about 2–15% moisture.

Control samples were not dehydrated further or heat treated.

Measurements of pH, either on samples before or after the thermal inhibition steps, were made on samples consisting of one part anhydrous starch or flour to four parts water.

Except where a conventional oven or dextrinizer is specified, the test samples were dehydrated and heat treated in a fluidized bed reactor, model number FDR-100, manufactured by Procedyne Corporation of New Brunswick, N.J. The cross-sectional area of the fluidized bed reator was 0.05 sq meter. The starting bed height was 0.3 to 0.8 meter, but usually 0.77 meter. The fluidizing gas was air except where otherwise indicated and was used at a velocity of 5–15 meter/min. The sidewalls of the reactor were heated with hot oil, and the fluidizing gas was heated with an electric heater.

The samples were loaded to the reactor and then the fluidizing gas introduced, or were loaded while the fluidizing gas was being introduced. No difference was noted in the samples in the order of loading. The samples were brought from ambient temperature to 125° C. until the samples became anhydrous, and were further heated to the specified heat treating temperatures. When the heat treating temperature was 160° C., the time to reach that temperature was less than three hours.

The moisture level of the samples at the final heating temperature was 0%, except where otherwise stated. Portions of the samples were removed and tested for inhibition at the temperatures and times indicated in the tables.

These samples were tested for inhibition using the following Brabender Procedure.

Brabender Procedure

Unless otherwise stated, the following Brabender procedure was used. All samples, except for corn, tapioca and waxy rice flour, were slurried in a sufficient amount of distilled water to give a 5% anhydrous solids starch slurry. Corn, tapioca, and waxy rice flour were slurried at 6.3% anhydrous solids. The pH was adjusted to pH 3.0 with a sodium citrate, citric acid buffer and the slurry introduced to the sample cup of a Brabender VISCO/Amylo/GRAPH fitted with a 350 cm/gram cartridge. The starch slurry was heated rapidly to 92° C. and held for 10 minutes. The peak viscosity and viscosity ten minutes after peak viscosity were recorded in Brabender Units (BU). The percentage breakdown in viscosity was calculated according to the formula:

$$\% \text{ Breakdown} = \frac{\text{peak} - (\text{peak} + 10')}{\text{peak}} \times 100$$

where "peak" is the peak viscosity in Brabender Units, and "(peak+10')" is the viscosity in Brabender Units at ten minutes after peak viscosity.

If no peak viscosity was reached, that is, the data indicate a rising curve or a flat curve, the viscosity at 92° C. and the viscosity at 30 minutes after attaining 92° C. were recorded.

Using data from Brabender curves, inhibition was determined to be present if when dispersed at 5–6.3% solids in water at 92°–95° C. and pH 3 during the Brabender heating cycle the Brabender data showed (i) no or almost no viscosity, indicating the starch was so inhibited it did not gelatinize or strongly resisted gelatinization; (ii) a continuous rising viscosity with no peak viscosity, indicating the starch was highly inhibited and gelatinized to a limited extent; (iii) a lower peak viscosity and a lower percentage breakdown in viscosity from peak viscosity compared to a control, indicating a moderate level of inhibition; or (iv) a slight increase in peak viscosity and a lower percentage breakdown compared to a control, indicating a low level of inhibition.

In the first three examples to follow, the moisture indicated is the moisture in the starch before the dehydration and heat treating steps. As indicated above, as the starches were brought from ambient temperature up to the heating temperature, the starches became anhydrous or substantially anhydrous.

EXAMPLE 1

This example illustrates the preparation of the starches of this invention from a commercial granular waxy maize base starch by the heat treatment process of this invention.

Processing conditions and their effects on viscosity and texture of waxy maize starch are set forth in Tables I and II, below.

To obtain a heat-stable, non-cohesive thickener, samples of granular starch were slurried in 1.5 parts of water, the pH of the slurry was adjusted with the addition of a 5% $Na_2CO$ solution and the slurry was agitated for 1 hour, then filtered, dried, and ground. The dry starch samples (150 g) were placed into an aluminum foil pan (4"×5"×1½") and heated in a conventional oven under the conditions described in Tables I and II. Brabender viscosity measurements demonstrated that the most heat-stable starches were obtained by heating at 160° C. and a pH of at least 8.0 for about 3.5 to 6.0 hours.

TABLE I

Process Variables - Granular Waxy Maize Starch

| Sample[a] | Heating (160° C.) | | | Cold Evaluation of Gelatinized Samples[d,e] | |
|---|---|---|---|---|---|
| | pH | Moisture % | Time (hrs) | Viscosity | Texture |
| 1 | 6.0 | 10.9 | 2 | heavy to very heavy | cohesive |
| 2 | 6.0 | 10.9 | 4 | thin to moderate | — |
| 3 | 8.2 | 10.6 | 3.5 | heavy to very heavy | cohesive, less than unmodified control |
| 4 | 8.2 | 10.6 | 4 | heavy to very heavy | slightly to moderately cohesive |
| 5 | 8.2 | 10.6 | 4.5 | heavy | non-cohesive |
| 6 | 8.2 | 10.6 | 5.5 | heavy, thinnest | non-cohesive |
| 7 | 8.2 | 10.6 | 6 | moderately heavy | non-cohesive |
| unmodified control[b] | — | | — | very heavy | cohesive |
| modified control[c] | — | | — | very heavy | non-cohesive |

[a]All samples were commercial samples of granular waxy maize starch obtained from National Starch and Chemical Company, Bridgewater, New Jersey.
[b]The unmodified control was a commercial granular waxy maize starch obtained from National Starch and Chemical company, Bridgewater, New Jersey.
[c]The modified control was a commercial cross-linked, (phosphorous oxychloride treated) granular waxy maize starch obtained from National Starch and Chemical Company, Bridgewater, New Jersey.
[d]Samples were cooked by slurrying 7.0 g of starch (at 12% moisture) in 91 mls water at neutral pHs and heating the starch slurry for 20 minutes in a boiling water bath.
[e]The cold evaluation was carried out at 25° C.

TABLE II

Brabender Evaluation of Granular Waxy Maize Starch

| Sample[a] | Process Variables | | | Brabender Viscosity[b] | |
|---|---|---|---|---|---|
| | pH | Heating Temp. (°C.) | Time (Hours) | Peak Viscosity (B.U.) | Viscosity at 95° C./20 Mins. (B.U.) |
| 3 | 8.2 | 160 | 3.5 | 985 | 830 |
| 4 | 8.2 | 160 | 4.0 | 805 | 685 |
| 5 | 8.2 | 160 | 4.5 | 640 | 635 |
| 6 | 8.2 | 160 | 5.5 | 575 | 570 |
| Unmodified control | — | none | none | 1640 | 630 |

TABLE II-continued

Brabender Evaluation of Granular Waxy Maize Starch

| | Process Variables | | | Brabender Viscosity[b] | |
|---|---|---|---|---|---|
| | | Heating | Time | Peak Viscosity | Viscosity at 95° C./20 |
| Sample[a] | pH | Temp. (°C.) | (Hours) | (B.U.) | Mins. (B.U.) |
| 1 | 6.0 | 160 | 2.0 | 1055 | 560 |
| 2 | 6.0 | 160 | 4.0 | 140 | 80 |

[a]see Table I for a description of samples.
[b]In the Brabender procedure, a sample containing 5.4% anhydrous solids of starch dispersed in water was heated rapidly to 50° C., then the heat was increased by 1.5° C. per minute to 95° C., and held for 20 minutes.

EXAMPLE 2

This example illustrates that a variety of starches may be processed by the method of this invention to provide a non-cohesive thickener with properties similar to chemically cross-linked starches.

Processing conditions and their effects on viscosity and texture of waxy barley, tapioca, V.O. hybrid and waxy rice starches are set forth in Tables III and IV, below.

TABLE III

Process Variables - Granular Starches

| | | Heating (160° C.) | | Cold Evaluation of Gelatinized Sample[b] | |
|---|---|---|---|---|---|
| Sample[a] | pH | Moisture % | time (hours) | viscosity/texture | |
| Waxy Barley Starch | | | | | |
| 1 | 8.7 | 8.5 | 1.5 | heavy | cohesive |
| 2 | 8.7 | 8.5 | 2.5 | heavy | sl.-mod. cohesive |
| 3 | 8.7 | 8.5 | 3.5 | mod. heavy to heavy | non-cohesive |
| 4 | 5.2 | 10.8 | 1.5 | thin | |
| 5 | 5.2 | 10.8 | 2.5 | thin/thinnest | |
| Waxy Barley Control | | | 0 | heavy | cohesive |
| Tapioca Starch | | | | | |
| 6 | 8.8 | 10.3 | 2 | heavy to very heavy | cohesive |
| 7 | 8.8 | 10.3 | 3 | heavy to very heavy | cohesive/-less than Sample 6 |
| 8 | 8.8 | 10.3 | 4 | heavy to very heavy | sl-moderately cohesive sl-lumpy |
| 9 | 8.8 | 10.3 | 5 | heavy | non-cohesive-lumpy |
| Tapioca - Control | | | 0 | very heavy | cohesive |
| 10 | 5.5 | 10.9 | 3 | moderately heavy | — |

TABLE III-continued

Process Variables - Granular Starches

| | | Heating (160° C.) | | Cold Evaluation of Gelatinized Sample[b] | |
|---|---|---|---|---|---|
| Sample[a] | pH | Moisture % | time (hours) | viscosity/texture | |
| Waxy Rice Starch | | | | | |
| Waxy Rice Control | | | 0 | very heavy | cohesive |
| 1 | 9.1 | 9.0 | 2 | very heavy | cohesive |
| 2 | 9.1 | 9.0 | 3 | heavy | sl-moderately cohesive |
| 3 | 9.1 | 9.0 | 4 | heavy | slightly cohesive |
| 4 | 9.1 | 9.0 | 5 | mod. heavy to heavy | non-cohesive |

[a]Tapioca starch samples were commercial granular starch obtained from National Starch and Chemical Company, Bridgewater, New Jersey. Waxy barley starch samples were commercial granular starch obtained from AlKo, Finland. Waxy rice starch samples were commercial granular starch obtained from Mitsubishi Corporation, Japan.
[b]Samples were cooked by slurrying 7.5 g of starch at 12% moisture in 100 mls of water and heating the starch slurry for 20 minutes in a boiling water bath.

TABLE IV

Process Variables - Granular Starches

| | | Heating (160° C.) | | Cold Evaluation of Gelatinized Sample[b] | |
|---|---|---|---|---|---|
| Sample[a] | pH | Moisture % | time (hours) | viscosity/texture | |
| V.O. Hybrid Starch | | | | | |
| 1 | 8.7 | 10.5 | 2.0 | heavy | cohesive very sl. less than control |
| 2 | 8.7 | 10.5 | 3.0 | heavy | sl.-mod. cohesive |
| 3 | 8.7 | 10.5 | 4.0 | mod. heavy to heavy | smooth, very sl. cohesive |
| 4 | 8.7 | 10.5 | 5.0 | moderately heavy | smooth, short, non-cohesive |
| 5 | 8.7 | 10.5 | 6.0 | moderate | smooth, short, non-cohesive |
| V.O. Hybrid Control | 5.9 | 11.4 | 0 | heavy | cohesive |

[a]V.O. hybrid starch samples were granular starches obtained from National Starch and Chemical Company, Bridgewater, New Jersey.
[b]Samples were cooked by slurrying 7.5 g of starch at 12% moisture in 100 mls of water and heating the starch slurry for 20 minutes in a boiling water bath.

The viscosity and texture evaluation results show that a non-cohesive, heat-stable starch thickener may be prepared from waxy barley, V.O. hybrid, tapioca and waxy rice starches by the process of this invention. The amount of inhibition (non-cohesive, thickening character in cooked aqueous dispersion) increased with increasing time of heat treatment.

EXAMPLE 3

This example illustrates the effects of temperature and pH, and starch moisture content on the viscosity and texture of the treated starch.

Part A:

A waxy maize starch sample (100 g) containing 20.4% moisture was heated in an oven at 100° C. for 16 hours in a sealed glass jar. A second sample was heated for 4 hours and a third sample was heated for 7 hours under the same conditions. The product viscosity and texture were compared to a 12.1% moisture granular waxy maize starch control using the cook evaluation method of Example 1, Table I. Results are shown in Table V, below.

TABLE V

Effect of Process Moisture

| Sample[a] Waxy Maize Starch | Process Variables[b] Heat Time (hours) | Cold Evaluation of Gelatinized Starch[c] | |
|---|---|---|---|
| | | Viscosity | Texture |
| 1. Test (20.4% H$_2$O) | 16 | heavy, slightly thinner than control | cohesive |
| 2. Control (12.1% H$_2$O) | 0 | heavy | cohesive |
| 3. Test (20.4% H$_2$O) | 4 | heavy | cohesive |
| 4. Control (12.1% H$_2$O) | 0 | heavy | cohesive |
| 5. Test (20.4% H$_2$O) | 7 | heavy | cohesive |
| 6. Control (12.1% H$_2$O) | 0 | heavy | cohesive |

[a]Samples were obtained from National Starch and Chemical Company, Bridgewater, New Jersey.
[b]Process was conducted at pH 5.2.
[c]See Table III for cook conditions.

The results demonstrate that moisture added during the process yields a product which is as cohesive and undesirable as a control starch which had not been.

Part B:

Samples (900 g) of a commercial granular waxy maize starch (obtained from National Starch and Chemical Company, Bridgewater, N.J.) were placed in a 10"×15"×0.75" aluminum tray and heated in an oven at 180° C. for 15, 30, 45 and 60 minutes. The pH of the starch was not adjusted and remained at about 5.2 during the heating process. Sample viscosity and texture were evaluated by the method of Example 1.

As shown in Table VI, below, the pH 5.2 samples were characterized by an undesirable, cohesive texture similar to that of a waxy maize starch control which had not been heat treated.

TABLE VI

Effect of Acidic Process pH

| Sample | Process Variables[a] Heating Time (minutes) | Cold Evaluation of Gelatinized Starch[b] | |
|---|---|---|---|
| | | Viscosity | Texture |
| 1 | 15 | very heavy | cohesive |
| 2 | 30 | very heavy | cohesive |
| 3 | 45 | very heavy | cohesive |
| 4 | 60 | heavy to very heavy | cohesive |
| control | 0 | very heavy | cohesive |

TABLE VI-continued

Effect of Acidic Process pH

[a]The pH was not adjusted from that of the native waxy maize starch (a pH = 5.2) and Samples 1–4 correspond to starch treated by the process of U.S. Pat. No. 4,303,451 (no pH adjustment).
[b]See Table III for cook conditions Thus, a combination of selected factors, including the pH, moisture content and the type of native starch, determine whether a desirable, non-cohesive, heat-stable starch thickener is produced by the process of this invention.

The thermally inhibited starches and controls in the following examples were prepared as described above and are defined by textural characteristics or in relation to data taken from Brabender curves using the above described procedure.

EXAMPLE 4

Tapioca, Waxy Maize and Waxy Rice Flour: Characterization of Inhibition by Brabender Procedure Samples of tapioca starch, waxy maize starch, and waxy rice flour at pH 9.4 to 9.6 were dehydrated to less than 1% moisture at a temperature below 125° C., equilibrated to 160° C., and then heated at 160° C. in a thermal reactor (a horizontal double ribbon jacketed vessel). The heat treating time for the samples ranged from three to six hours.

The samples were evaluated for inhibition according to the above Brabender procedure and the results are given in the following table. The dehydrated and heated starches and flour exhibited a viscosity inhibited from breakdown relative to the controls that were not dehydrated and heated. This inhibition correlated to a short, noncohesive texture in the cooled product.

| Starch at initial pH 9.4–9.6 | | Peak Viscosity BU | Peak + 10' BU | % Breakdown ± 2% |
|---|---|---|---|---|
| Tapioca | Control | 1300 | 385 | 70.4 |
| | Inhib'd | 340 | 295 | 13.2 |
| Waxy Maize | Control | 1135 | 405 | 64.3 |
| | Inhib'd | 580 | 560 | 3.5 |
| Waxy Rice Flour | Control | 1140 | 307 | 73.1 |
| | Inhib'd | 600 | 590 | 1.7 |

EXAMPLE 5

Waxy Maize: Effects of Initial pH and Heating Time

The effects of initial pH and heat treating time on the level of inhibition on samples of waxy maize starch at naturally occurring pH (about 6.0) and at pH 7.5, pH 8.5 and pH 9.5 were evaluated and the data set out in the following table. The data show that starches with varying levels of inhibition, as reflected by the variance in percentage breakdown in viscosity, can be obtained at different heating times and initial pHs, and that a higher degree of inhibition can be obtained at the higher pH values and at longer heating times. Moreover, comparing the shortened heat treating times in this Example, in which the fluidized bed reactor was used, with the heat treating times in hours in Examples 4 and 5, it can be seen that inhibited starches with higher peak viscosities can be obtained at much shorter times using the fluidized bed than are possible with standard thermal reactors or ovens.

Waxy Maize Heat Treated at 160° C.
Effects of Initial pH and Heating Time

| Initial pH | Heating Time min | Peak Viscosity (BU) | Peak at 10' (BU) | % Breakdown ± 2% |
|---|---|---|---|---|
| 6.0 | control | 1135 | 405 | 64.3 |
| 6.0 | 0 | 1058 | 463 | 56.4 |
|  | 30 | 710 | 460 | 35.2 |
|  | 60 | 645 | 445 | 31 |
|  | 90 | 570 | 440 | 22.8 |
|  | 120 | 560 | 440 | 21.4 |
|  | 150 | 485 | 395 | 18.6 |
| 7.3 | 90 | 645 | 500 | 22.5 |
|  | 120 | 580 | 450 | 22.4 |
|  | 150 | 572 | 445 | 22.2 |
|  | 180 | 522 | 427 | 18.1 |
| 8.5 | 0 | 980 | 630 | 35.7 |
|  | 30 | 770 | 655 | 14.9 |
|  | 60 | 665 | 615 | 6.0 |
|  | 90 | 625 | 600 | 4.0 |
|  | 120 | 585 | 580 | 0.9 |
| 9.5 | 0 | 1055 | 880 | 16.6 |
|  | 30 | 825 | 800 | 3.0 |
|  | 60 | 705 | 700 | 0.7 |
|  | 90 | 690 | 690 | 0 |
|  | 120 | 665 | 660 | 0.7 |

EXAMPLE 6

Waxy Maize: Effects of Heating Temperature and Time

The effects of heat treating temperatures and times on the level of inhibition on waxy maize starch at pH 9.5 were evaluated and the results set out in the following table. The data show that inhibited samples can be obtained at heat treating temperatures between 100°–200° C., with more inhibition obtained at higher temperatures, or at longer times with lower temperatures. The starch samples heated at 200° C. were highly inhibited (rising curves) or completely inhibited (no gelatinization).

Waxy Maize pH 9.5
Effects of Heating Time and Temperature

| Heating Temp | Time at Heating Temp | Peak Viscosity (BU) | Peak at 10' (BU) | % Breakdown ± 2% |
|---|---|---|---|---|
|  | control | 1135 | 405 | 64.3 |
| 100° C. | 22 hrs | 1185 | 215 | 18.1 |
| 160° C. | 0 | 1055 | 175 | 16.6 |
| 160° C. | 120 min | 665 | 5 | 0.7 |
| 175° C. | 0 | 850 | 95 | 11.2 |
| 180° C. | 0 | 715 | 35 | 4.9 |
| 190° C. | 0 | 555 | 5 | 0.9 |
| 200° C. | 0 | rising curve |  |  |
| 200° C. | 120 min | flat curve |  |  |

EXAMPLE 7

Waxy Maize: Effect of Moisture and pH

Waxy maize starch at initial pH 9.5 was evaluated for inhibition in the presence of between 1–2% moisture by weight of the sample by injecting saturated air into the chambers of the fluidized bed reactor. The results are set out in the following tables and show that more inhibition can be obtained when the starch is heat treated at anhydrous or substantially anhydrous conditions than if heat treated in the presence of moisture (note the lower percentage in viscosity breakdown for the anhydrous samples).

| Control | | Viscosity in Brabender Units | | | % Bkdn ± |
|---|---|---|---|---|---|
| | | Peak + | | | |
| Temp ° C. | Time min | Peak 1140 | 10' 410 | 92° C. | 92° C. + 30' | 2% 64 |
| Waxy Maize pH 9.4 0% Moisture | | | | | | |
| 140 | 0 | 1260 | 500 | — | — | 60 |
| 150 | 0 | 1160 | 540 | — | — | 45 |
| 155 | 0 | 1100 | 720 | — | — | 35 |
| 160 | 0 | 1080 | 840 | — | — | 22 |
| 160 | 0 | 930 | 825 | — | — | 11 |
| 160 | 15 | 760 | 740 | — | — | 3 |
| 160 | 30 | 700 | 690 | — | — | 1 |
| 160 | 45 | 695 | 690 | — | — | 1 |
| 160 | 60 | — | — | 490 | 690 | ris.visc* |
| 160 | 90 | 605 | 590 | 414 | 590 | ris.visc. |
| 160 | 120 | — | — | 320 | 580 | ris.visc. |
| 160 | 150 | — | — | 200 | 480 | ris.visc. |
| Waxy Maize pH 9.4 1–2% Moisture | | | | | | |
| 155 | 0 | 1215 | 465 | — | — | 62 |
| 160 | 0 | 1090 | 530 | — | — | 51 |
| 160 | 15 | 985 | 740 | — | — | 25 |
| 160 | 30 | 885 | 700 | — | — | 21 |
| 160 | 45 | 750 | 530 | — | — | 29 |
| 160 | 60 | 700 | 480 | — | — | 31 |
| 160 | 90 | 685 | 505 | — | — | 26 |
| 160 | 120 | 610 | 450 | — | — | 26 |
| 160 | 150 | 580 | 430 | — | — | 26 |
| 160 | 180 | 530 | 400 | — | — | 25 |

*Rising viscosity.

EXAMPLE 8

Corn Starch: Effect of pH and Heating Time at 160° C.

The effects of initial pH and heat treating times at 160° C. on the level of inhibition on samples of corn starch at its naturally occurring pH, and at an initial pH 9.5, were evaluated and the results set out in the following tables. The data show that very high levels of inhibition can be obtained at basic pH (note increasing viscosity) compared to natural pH, and that more inhibition is obtained with longer heat-treating times.

| Corn natural pH Control | | Viscosity in Brabender Units | | | | % Bkdn ± |
|---|---|---|---|---|---|---|
| | | Peak + | | | | |
| Temp 160° C. | Time min | Peak 640 | 10' 420 | 92° C. | 92° C. + 30' | 2% 34 |
| 0 | 560 | 370 | — | — | | 34 |
| 30 | 510 | 330 | — | — | | 35 |
| 60 | 500 | 400 | — | — | | 20 |
| 90 | 450 | 360 | — | — | | 20 |
| 120 | 410 | 335 | — | — | | 18 |

| Corn pH 9.5 Control | | Viscosity in Brabender Units | | | | % Bkdn ± |
|---|---|---|---|---|---|---|
| | | Peak + | | | | |
| Temp 160° C. | Time min | Peak 660 | 10' 550 | 92° C. | 92° C. + 30' | 2% 17 |
| 0 | 990 | 900 | — | — | | 9 |
| 30 | 940 | 910 | — | — | | 3 |
| 60 | — | — | 20 | 910 | | ris.visc. |
| 90 | — | — | 20 | 690 | | ris.visc. |
| 120 | — | — | 20 | 510 | | ris.visc. |

EXAMPLE 9

Potato Starch: Effect of pH

The effect of initial pH on the level of inhibition on samples of potato starch at naturally occurring pH and at initial pH 9.5 was evaluated and the results set out in the following tables.

The Brabender data at naturally occurring pH indicate that starch degradation, rather than inhibition, occurred as heat treating progressed. This example illustrates that thermal inhibition can be a function of both pH and the starting starch. In this case, thermal inhibition of potato starch appears to be more dependent on pH compared to other starches (for example, waxy maize). Therefore, the conditions required for dehydration and successful thermal inhibition of potato starch are more strict in order to avoid hydrolysis and degradation.

Dehydration and heat treating in the basic pH range, however, provided inhibited starches that maintained high viscosities, and at heat treating times over 90 minutes, provided highly inhibited starches as indicated by a continuous increasing viscosity.

| Potato natural pH Control | | Viscosity in Brabender Units | | | | % Bkdn ± |
|---|---|---|---|---|---|---|
| | | Peak + | | | | |
| Temp 160° C. | Time min | Peak 785 | 10' 310 | 92° C. | 92° C. + 30' | 2% 61 |
| 125 | 0 | 560 | 360 | — | — | 36 |
| 160 | 0 | 240 | 140 | — | — | 42 |
| 160 | 90 | 22 | 15 | — | — | 32 |
| 160 | 180 | 20 | 18 | — | — | 10 |

| Potato pH 9.5 Control | | Viscosity in Brabender Units | | | | % Bkdn ± |
|---|---|---|---|---|---|---|
| | | Peak + | | | | |
| Temp 160° C. | Time min | Peak 690 | 10' 390 | 92° C. | 92° C. + 30' | 2% 43 |
| 0 | 640 | 480 | — | — | | 25 |
| 30 | 940 | 795 | — | — | | 15 |
| 60 | 1020 | 900 | — | — | | 12 |
| 90 | 995 | 945 | — | — | | 5 |
| 120 | — | — | 800 | 980 | | ris.visc. |
| 150 | — | — | 650 | 870 | | ris.visc. |
| 180 | — | — | 350 | 680 | | ris.visc. |

EXAMPLE 10

Waxy Maize with Endogenous Protein: Effect of Protein, Time, and Temperature

The effects of the presence of protein, and heat treating times and temperatures on inhibition on samples of waxy maize containing 3.95% endogenous protein, adjusted to pH 8.5 and 9.5, and on samples containing 1.52% endogenous protein, adjusted to pH 7.5 and 9.5, were evaluated and the results set out in the following tables. The data show that the presence of protein leads to higher levels of inhibition than are attained in samples without protein. The results also show that the protein level, the pH and the time and the temperature for heat treating all have an independent and a cumulative effect on the level of inhibition, so that inhibition increases as the protein, pH, time, and temperature increase.

| Waxy Maize 3.95% endogenous protein pH 9.5 | | Viscosity in Brabender Units | | | | % Bkdn ± 2% |
|---|---|---|---|---|---|---|
| | | Peak | Peak + 10' | 92° C. | 92° C. + 30' | |
| Control | | 940 | 400 | | | 57 |
| Temp °C. | Time min | | | | | |
| 125 | 0 | — | — | 660 | 680 | ris.visc. |
| 125 | 30 | — | — | 710 | 750 | ris.visc. |
| 140 | 0 | — | — | 540 | 600 | ris.visc. |
| 160 | 0 | — | — | 350 | 375 | ris.visc. |
| 160 | 30 | — | — | 260 | 295 | ris.visc. |
| 160 | 60 | — | — | 220 | 275 | ris.visc. |
| 160 | 90 | — | — | 180 | 255 | ris.visc. |
| 160 | 100 | — | — | 130 | 200 | ris.visc. |
| 160 | 120 | — | — | 150 | 210 | ris.visc. |
| 160 | 150 | — | — | 150 | 190 | ris.visc. |
| 160 | 180 | — | — | 130 | 180 | ris.visc. |

| Waxy Maize 1.52% endogenous protein pH 9.5 | | Viscosity in Brabender Units | | | | % Bkdn ± 2% |
|---|---|---|---|---|---|---|
| | | Peak | Peak + 10' | 92° C. | 92° C. + 30' | |
| Control | | 1030 | 300 | | | 71 |
| Temp °C. | Time min | | | | | |
| 125 | 0 | 1090 | 540 | — | — | 50 |
| 125 | 15 | 1080 | 650 | — | — | 40 |
| 140 | 0 | 1010 | 840 | — | — | 17 |
| 160 | 30 | — | — | 480 | 575 | ris.visc. |
| 160 | 60 | — | — | 340 | 610 | ris.visc. |
| 160 | 90 | — | — | 255 | 540 | ris.visc. |
| 160 | 120 | — | — | 120 | 340 | ris.visc. |

| 160 | 150 | — | — | 120 | 330 | ris.visc. |

| Waxy Maize 3.95% endogenous protein pH 8.5 | Viscosity in Brabender Units | | | | |
|---|---|---|---|---|---|
| | Peak | Peak + 10' | 92° C. | 92° C. + 30' | % Bkdn ± 2% |
| Control | 740 | 235 | | | 68 |
| Temp °C. | Time min | | | | |
| 125 | 0 | 1005 | 550 | — | — | 45 |
| 125 | 15 | 935 | 700 | — | — | 25 |
| 140 | 0 | 705 | 610 | — | — | 13 |
| 160 | 0 | — | — | 470 | 480 | ris.visc. |
| 160 | 30 | — | — | 380 | 455 | ris.visc. |
| 160 | 60 | — | — | 290 | 430 | ris.visc. |
| 160 | 90 | — | — | 235 | 410 | ris.visc. |
| 160 | 120 | — | — | 210 | 380 | ris.visc. |

| Waxy Maize 1.52% endogenous protein pH 7.6 | Viscosity in Brabender Units | | | | |
|---|---|---|---|---|---|
| | Peak | Peak + 10' | 92° C. | 92° C. + 30' | % Bkdn ± 2% |
| Control | 1100 | 240 | | | 78 |
| Temp °C. | Time min | | | | |
| 125 | 0 | 1230 | 480 | — | — | — |
| 140 | 0 | 950 | 730 | — | — | 23 |
| 140 | 0 | 660 | 570 | — | — | 14 |
| 160 | 30 | 535 | 505 | — | — | 6 |
| 160 | 60 | — | — | 480 | 415 | ris.visc. |
| 160 | 90 | — | — | 490 | 430 | ris.visc. |
| 160 | 120 | — | — | 465 | 435 | ris.visc. |
| 160 | 150 | — | — | 435 | 420 | ris.visc. |

EXAMPLE 11

Waxy Maize Substituted with Propylene Oxide: Effect of Etherification and pH Waxy maize samples reacted with 7% and at 3% by weight propylene oxide, at naturally occurring pH and at pH 9.5, were evaluated for inhibtion and the results set out in the following tables.

The data show that substituted starches, in this case etherified starches, can be thermally inhibited by this process and that higher inhibition can be achieved at higher pH.

In addition to propylene oxide, other suitable etherifying agents known and used in the art can be used to etherify starches before or after thermal inhibition. Exemplary etherifying agents are be acrolein, epichlorohydrin and combinations of epichlorohyrin and propylene oxide.

| Waxy Maize 7% PO natural pH | Viscosity in Brabender Units | | | | |
|---|---|---|---|---|---|
| | Peak | Peak + 10' | 92° C. | 92° C. + 30' | % Bkdn ± 2% |
| Control | 1420 | 395 | | | 72 |
| Temp 160° C. | Time min | | | | |
| | 0 | 1030 | 380 | — | — | 63 |
| | 30 | 800 | 530 | — | — | 34 |
| | 60 | 685 | 430 | — | — | 37 |
| | 90 | 635 | 340 | — | — | 46 |
| | 120 | 620 | 340 | — | — | 45 |
| | 150 | 565 | 300 | — | — | 47 |
| | 180 | 540 | 280 | — | — | 48 |

| Waxy Maize 7% PO pH 9.5 | Viscosity in Brabender Units | | | | |
|---|---|---|---|---|---|
| | Peak | Peak + 10' | 92° C. | 92° C. + 30' | % Bkdn ± 2% |
| Control | 1420 | 395 | | | 72 |
| Temp 160° C. | Time min | | | | |
| | 0 | 1360 | 960 | — | — | 29 |
| | 30 | 1010 | 950 | — | — | 6 |
| | 60 | 1030 | 930 | — | — | 10 |
| | 90 | 910 | 890 | — | — | 2 |
| | 120 | 843 | 830 | — | — | 2 |
| | 180 | 800 | 792 | — | — | 1 |

| Waxy Maize 3% PO natural pH | Viscosity in Brabender Units | | | | |
|---|---|---|---|---|---|
| | Peak | Peak + 10' | 92° C. | 92° C. + 30' | % Bkdn ± 2% |
| Control | 1155 | 280 | | | 76 |
| Temp 160° C. | Time min | | | | |
| | 0 | 900 | 360 | — | — | 60 |
| | 30 | 570 | 370 | — | — | 35 |
| | 60 | 480 | 350 | — | — | 27 |
| | 90 | 440 | 300 | — | — | 32 |
| | 120 | 375 | 235 | — | — | 37 |
| | 150 | 310 | 185 | — | — | 40 |
| | 180 | 300 | 180 | — | — | 40 |

| Waxy Maize 3% PO pH 9.5 | Viscosity in Brabender Units | | | | |
|---|---|---|---|---|---|
| | Peak | Peak + 10' | 92° C. | 92° C. + 30' | % Bkdn ± 2% |
| Control | 1155 | 280 | | | 76 |
| Temp 160° C. | Time min | | | | |
| | 0 | 1220 | 960 | — | — | 21 |
| | 30 | 1020 | 950 | — | — | 7 |
| | 60 | 880 | 865 | — | — | 2 |
| | 90 | — | — | 750 | 790 | ris.visc. |
| | 120 | — | — | 620 | 780 | ris.visc. |
| | 150 | — | — | 510 | 750 | ris.visc. |
| | 180 | — | — | 400 | 700 | ris.visc. |

EXAMPLE 12

Waxy Maize Substituted with Acetyl Groups: Effect of Esterification and pH

Waxy maize samples at naturally occurring pH and at pH 8.5, reacted with 1% by weight acetic anhydride, were evaluated for inhibition and the results set out in the following tables.

The data show that substituted starches, in this case esterified starches, can be inhibited to varying degrees and that higher inhibition can be obtained at higher pH.

In addition to acetic anhydride, other common esterifying agents known and used in the art can be used to esterify starches before or after thermal inhibition. Exemplary esterifying agents are acetic anhydride, a combination of acetic anhydride and adipic anhydride, monosodium orthophosphate, 1-octyl succinic anhydride, a combination of 1-octyl succinic anhydride and aluminum sulfate, phosphorus oxychloride, a combination of phohphorus oxychloride and either acetic anhydride or vinyl acetate, sodium trimetaphosphate, a combination of sodium trimetaphosphate and sodium tripolyphosphate, succinic anhydride, and vinyl acetate.

| Waxy Maize 1% acetic anhydride natural pH | Viscosity in Brabender Units | | | | % Bkdn ± 2% |
|---|---|---|---|---|---|
| | Peak | Peak + 10' | 92° C. | 92° C. + 30' | |
| Control | 1480 | 490 | | | 67 |
| Temp Time | | | | | |
| 160° C. min | | | | | |
| 0 | 1030 | 570 | — | — | 45 |
| 30 | 880 | 650 | — | — | 26 |
| 60 | 720 | 510 | — | — | 29 |
| 120 | 605 | 490 | — | — | 19 |
| 180 | 545 | 460 | — | — | 16 |

| Waxy Maize 1% acetic anhydride pH 8.5 | Viscosity in Brabender Units | | | | % Bkdn ± 2% |
|---|---|---|---|---|---|
| | Peak | Peak + 10' | 92° C. | 92° C. + 30' | |
| Control | 1480 | 490 | | | 67 |
| Temp Time | | | | | |
| 160° C. min | | | | | |
| 0 | 1170 | 560 | — | — | 52 |
| 30 | 970 | 725 | — | — | 25 |
| 60 | 875 | 600 | — | — | 31 |
| 120 | 690 | 490 | — | — | 29 |
| 180 | 585 | 545 | — | — | 7 |

EXAMPLE 13

Waxy Maize Crosslinked with $POCl_3$: Effect of Crosslinking and pH

Waxy maize samples, crosslinked with $POCl_3$ at 0.02% by weight, at naturally occurring pH and at pH 9.5 were evaluated for inhibition and the results set out in the following tables. The data show decreasing viscosity and almost no breakdown in viscosity with longer heat treating times, indicating that crosslinked starches can be made even more inhibited by this process. The data also show that increasing the pH further increases inhibition.

| Waxy Maize $POCl_3$ natural pH | Viscosity in Brabender Units | | | | % Bkdn ± 2% |
|---|---|---|---|---|---|
| | Peak | Peak + 10' | 92° C. | 92° C. + 30' | |
| Control | 830 | 820 | | | 1 |
| Temp Time | | | | | |
| 160° C. min | | | | | |
| 0 | 750 | 742 | 730 | 720 | 1 |
| 30 | 635 | 522 | 630 | 580 | 2 |
| 60 | 550 | 525 | 550 | 465 | 5 |
| 90 | 425 | 415 | 420 | 360 | 2 |
| 120 | 335 | 315 | 330 | 280 | 6 |
| 150 | 280 | 260 | 280 | 210 | 7 |
| 180 | 205 | 200 | 200 | 180 | 2 |

| Waxy Maize $POCl_3$ pH 9.5 | Viscosity in Brabender Units | | | | % Bkdn ± 2% |
|---|---|---|---|---|---|
| | Peak | Peak + 10' | 92° C. | 92° C. + 30' | |
| Control | 830 | 820 | | | 1 |
| Temp Time | | | | | |
| 160° C. min | | | | | |
| 0 | 750 | 720 | — | — | 4 |
| 30 | — | — | 630 | 660 | ris. visc. |
| 60 | — | — | 400 | 635 | ris. visc. |
| 90 | — | — | 330 | 520 | ris. visc. |
| 120 | — | — | 180 | 530 | ris. visc. |
| 150 | — | — | 110 | 470 | ris. visc. |
| 180 | — | — | 100 | 470 | ris. visc. |

EXAMPLE 14

Waxy Maize: Adjustment of Starch pH in Fluid Bed by Sparging $NH_3$ into Fluidizing Gas $N_2$ Waxy maize samples at an initial moisture content of 10.9% were introduced to a fluidized bed reactor, with a nitrogen fluidizing gas containing ammonia in the concentrations specified in the tables. The samples were evaluated for the effect of the ammonia gas on the level of inhibition. Comparing the results to those obtained in Example 5 at pH 9.5, it can be seen that ammonia gas is effective to raise the pH of the starch and prevent hydrolysis, but is not as effective as direct pH adjustment of the starch in preventing hydrolysis and promoting inhibition.

| Waxy Maize 0.1% $NH_3$ in $N_2$ | Viscosity in Brabender Units | | % Bkdn ± 2% | Final pH |
|---|---|---|---|---|
| | Peak | Peak + 10' | | |
| Control | 1040 | 200 | 81 | |
| Temp Time | | | | |
| 160° C. min | | | | |
| 0 | 965 | 450 | 53 | 8.7 |
| 60 | 625 | 420 | 33 | 8.6 |
| 120 | 440 | 325 | 26 | 8.9 |
| 180 | 340 | 290 | 15 | 8.8 |
| 240 | 300 | 250 | 17 | 8.4 |

| Waxy Maize 1% $NH_3$ in $N_2$ | Viscosity in Brabender Units | | % Bkdn ± 2% | Final pH |
|---|---|---|---|---|
| | Peak | Peak + 10' | | |
| Control | 1040 | 200 | 81 | |
| Temp Time | | | | |
| 160° C. min | | | | |
| 0 | 1100 | 460 | 58 | 8.9 |
| 60 | 670 | 470 | 30 | 8.8 |
| 120 | 505 | 405 | 20 | 8.9 |
| 180 | 410 | 345 | 16 | 8.9 |
| 210 | 380 | 320 | 16 | 9.8 |

| Waxy Maize 10% $NH_3$ in $N_2$ | Viscosity in Brabender Units | | % Bkdn ± 2% | Final pH |
|---|---|---|---|---|
| | Peak | Peak + 10' | | |
| Control | 1040 | 200 | 81 | |
| Temp Time | | | | |
| 160° C. min | | | | |
| 0 | 1020 | 390 | 62 | 9.7 |
| 60 | 730 | 410 | 44 | 9.6 |
| 120 | 540 | 360 | 33 | 9.6 |
| 180 | 415 | 310 | 25 | 10.2 |
| 240 | 330 | 270 | 18 | 10.4 |

EXAMPLE 15

Waxy Maize: Adjustment of pH in Fluid Bed by Spraying $Na_2CO_3$

Waxy maize samples were introduced to a fluidized bed reactor and sprayed with a 25% solution of sodium carbonate, while the fluidizing gas was being introduced, in order to raise the pH. The samples were then brought from ambient temperature to 160° C. in less than three hours, and held at 160° C. for the times specified in the table.

The samples were evaluated for inhibition. The data show that this technique is successful for raising the pH of the samples in order to prevent acid hydrolysis and promote inhibition.

| Waxy Maize with Na$_2$CO$_3$ | | Viscosity in Brabender Units | | % Bkdn ± 2% | Final pH |
|---|---|---|---|---|---|
| | | Peak | Peak + 10' | | |
| Control | | 1040 | 200 | 81 | |
| Temp 160° C. | Time min | | | | |
| | 0 | 1000 | 500 | 50 | 9.4 |
| | 30 | 750 | 530 | 29 | 9.2 |
| | 60 | 645 | 500 | 22 | 9.1 |
| | 180 | 465 | 400 | 14 | 9 |

EXAMPLE 16

Waxy Maize: Effect of Fluidizing Gas

The effect of the fluidizing gas on the level of inhibition was evaluated on waxy maize samples at pH 9.5 fluidized with nitrogen gas and with air. The samples were tested for inhibition and the data show that a higher rate of inhibition is attained when air is used as a fluidizing gas compared to nitrogen.

| Waxy Maize pH 9.5 160° C. | | Nitrogen | | | Air | |
|---|---|---|---|---|---|---|
| Time (min) | Peak | Peak + 10' | % Bkdn ± 2% | Peak | Peak + 10' | % Bkdn ± 2% |
| 0 | 1055 | 880 | 16.6 | 1055 | 880 | 16.6 |
| 30 | 1150 | 920 | 20 | 825 | 800 | 3 |
| 60 | 985 | 870 | 11.7 | 705 | 700 | 0.7 |
| 90 | 875 | 810 | 7.4 | 690 | 690 | 0 |
| 120 | 865 | 815 | 5.9 | 665 | 660 | 0.7 |
| 180 | 820 | 755 | 7.9 | 630 | 620 | 1.6 |

EXAMPLE 17

Effect of High Amylose Content

Samples of a high amylose containing starch (Hylon V) at natural pH and pH 9.5 were evaluated for the effect of high amylose content on inhibition. Due to the high levels of amylose, it was necessary to use a pressurized Visco/amylo/Graph (C. W. Brabender, Hackensack, N.J.) to obtain Brabender curves. Samples were slurried at 10% starch solids, heated to 120° C. and held for 30 minutes. The data show that inhibition was obtained only on the high pH sample.

| High Amylose Corn | natural pH | | | pH 9.5 | | |
|---|---|---|---|---|---|---|
| | peak | peak + 10' | % Bkdn | peak | peak + 10' | % Bkdn |
| Control 160° C. | 1180 | 525 | 55.5 | 1180 | 525 | 55.5 |
| Time (min) | | | | | | |
| 0 | 700 | 235 | 66 | | | |
| 120 | 282 | 25 | 91 | 290 | 225 | 22 |

EXAMPLE 18

Waxy Maize and Tapioca: Acid Converted

Samples of waxy maize and tapioca starch were slurried in 1.5 parts water. The slurries were placed in a 52° C. water bath, with agitation, and allowed to equilibrate for one hour. Concentrated HCl was added at 0.8% on the weight of the samples. The samples were allowed to convert at 52° C. for one hour. The pH was then adjusted to 5.5 with sodium carbonate, then to pH 8.5 with sodium hydroxide. The samples were recovered by filtering and air drying (approximately 11% moisture). The starches in 50 g amounts were placed in an aluminum tray, covered and placed into a forced draft oven at 140° C. for 5.5 hours. The starches were evaluated for inhibition and the results set out in the following table and show that converted starches can be thermally inhibited by this process.

| Acid Converted Starches | Waxy Maize | | | Tapioca | | |
|---|---|---|---|---|---|---|
| | peak | peak + 10' | % Bkdn | peak | peak + 10' | % Bkdn |
| unmodified | 1380 | 250 | 81.9 | 810 | 225 | 72.2 |
| acid converted | 640 | 110 | 82.3 | 432 | 115 | 73.4 |
| thermally inhibited acid converted | 805 | 728 | 9.6 | 495 | 350 | 29.3 |

EXAMPLE 18

Use of Thermally Inhibited Waxy Maize, Natural pH, in Food

This example describes the preparation of a barbecue sauce containing a thermally inhibited waxy maize starch at its naturally occurring pH (pH 6), heat treated at 160° C. for 150 minutes (T-I starch). The ingredients in percent by weight are as follows:

| T-I starch | 2.5% |
|---|---|
| sugar | 3.0 |
| salt | 0.3 |
| paprika | 0.2 |
| chili powder | 0.2 |
| cinnamon | 0.2 |
| ground cloves | 0.2 |
| tomato puree | 47.4 |
| minced onion | 5.3 |
| Worcestershire sauce | 6.6 |
| water | 26.2 |
| vinegar | 7.9 |
| TOTAL | 100.0 |

The sauce is heated to 85° C., held for 15 minutes, and cooled overnight at room temperature. The sauce will have a smooth, non-cohesive texture.

Statement of Utility

The granular thermally inhibited starches prepared by this process can be used in food products or in industrial products wherever chemically crosslinked starches are used. The major advantage of these starches is that they have the inhibited characteristics of chemically crosslinked starches without the use of chemical reagents. A further advantage is that these thermally-inhibited starches and flours are substantially sterilized by the thermal inhibition process and remain sterile when properly stored. It is also an advantage that when a starch with naturally occurring freeze-thaw stability is thermally inhibited by this process, the thermally inhibited starch retains its freeze-thaw stability.

We claim:

1. A process for making a thermally-inhibited, non-pregelatinized granular starch which comprises the steps of:

(a) dehydrating the non-pregelatinized granular starch to substantially anhydrous or anhydrous; and (b) while maintaining the dehydrated, non-pregelatinized granular starch substantially anhydrous or anhydrous, heat treating at a temperature of 100° C. or greater for a period of time sufficient to inhibit the starch.

2. A process for making a thermally-inhibited, non-pregelatinized granular starch which comprises the steps of:

(a) raising the pH of the non-pregelatinized granular starch to neutral or greater;

(b) dehydrating the pH-adjusted, non-pregelatinized granular starch to substantially anhydrous or anhydrous; and (b) while maintaining the dehydrated, non-pregelatinized granular starch substantially anhydrous or anhydrous, heat treating at a temperature of 100° C. or greater for a period of time sufficient to inhibit the starch.

3. The process of claim 2, in which the pH is raised to greater than 8.

4. The process of claim 2 or 3, further comprising the step of washing the thermally inhibited, granular starch after the heat treating step.

5. The process of claim 1 or 2 in which the dehydrating and heat treating steps occur simultaneously.

6. The process of claim 1, 2, or 5 in which the starch is dehydrated and heat treated in a fluidized bed reactor.

* * * * *

Disclaimer

5,725,676 — Chung-Wai Chiu, Westfield; Eleanor Schiermeyer, Bound Brook; David J. Thomas, Flemington; Manish B. Shah, Somerset, all of N.J. THERMALLY INHIBITED STARCHES AND FLOURS AND PROCESS FOR THEIR PRODUCTION. Patent dated March. 10, 1998. Disclaimer filed March. 27, 1998, by the assignee National Starch and Chemical Investment Holding Corporation.

The term of this patent shall not extend beyond the expiration date of Application No. 08/473688.

(*Official Gazette, January 31, 2012*)

US005725676C1

(12) EX PARTE REEXAMINATION CERTIFICATE (9549th)
United States Patent
Chiu et al.

(10) Number: US 5,725,676 C1
(45) Certificate Issued: Mar. 7, 2013

(54) THERMALLY INHIBITED STARCHES AND FLOURS AND PROCESS FOR THEIR PRODUCTION

(75) Inventors: Chung-Wai Chiu, Westfield, NJ (US); Eleanor Schiermeyer, Bound Brook, NJ (US); David J. Thomas, Flemington, NJ (US); Manish B. Shah, Somerset, NJ (US)

(73) Assignee: Corn Products Development, Inc., Westchester, IL (US)

Reexamination Request:
No. 90/011,967, Oct. 19, 2011

Reexamination Certificate for:
Patent No.: 5,725,676
Issued: Mar. 10, 1998
Appl. No.: 08/374,279
Filed: Jan. 18, 1995

Related U.S. Application Data

(63) Continuation-in-part of application No. 08/296,211, filed on Aug. 25, 1994, now abandoned, and a continuation-in-part of application No. PCT/US94/08559, filed on Jul. 29, 1994, said application No. 08/296,211 is a continuation-in-part of application No. 08/099,753, filed on Jul. 30, 1993, now abandoned.

(51) Int. Cl.
| | | |
|---|---|---|
| *A21D 2/00* | (2006.01) | |
| *A12D 2/18* | (2006.01) | |
| *A12D 6/00* | (2006.01) | |
| *A23G 3/34* | (2006.01) | |
| *A23G 9/52* | (2006.01) | |
| *A23L 1/24* | (2006.01) | |
| *A23L 1/0522* | (2006.01) | |

(52) U.S. Cl. .................. 127/34; 127/69; 127/70; 127/71
(58) Field of Classification Search ........................ None
See application file for complete search history.

(56) References Cited

To view the complete listing of prior art documents cited during the proceeding for Reexamination Control Number 90/011,967, please refer to the USPTO's public Patent Application Information Retrieval (PAIR) system under the Display References tab.

*Primary Examiner* — Gary Kunz

(57) ABSTRACT

Thermally inhibited starches and flours are prepared by a process comprising dehydrating and heat treating a granular starch or flour.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 6 are determined to be patentable as amended.

Claims 3-5, dependent on an amended claim, are determined to be patentable.

New claim 7 is added and determined to be patentable.

1. A process for making a thermally-inhibited, non-pregelatinized granular starch which comprises the steps of:
   (a) dehydrating the non-pregelatinized granular starch to substantially anhydrous or anhydrous; and
   (b) while maintaining the dehydrated non-pregelatinized granular starch substantially anhydrous or anhydrous, heat treating at a temperature of [100° C.] *100° C* or greater for a period of time sufficient to inhibit the starch,
   *wherein substantially anhydrous or anhydrous is less than 1 wt % moisture.*

2. A process for making a thermally-inhibited, non-pregelatinized granular starch which comprises the steps of:
   (a) raising the pH of the non-pregelatinized granular starch to neutral or greater;
   (b) dehydrating the pH-adjusted, non-pregelatinized granular starch to substantially anhydrous or anhydrous; and
   [(b)] (*c*) while maintaining the dehydrated non-pregelatinized granular starch substantially anhydrous or anhydrous, heat treating at a temperature of [100° C.] *100° C* or greater for a period of time sufficient to inhibit the starch,
   *wherein substantially anhydrous or anhydrous is less than 1 wt % moisture.*

6. The process of claims [1, 2 or 5] *1 or 2* in which the starch is dehydrated and heated in a fluidized bed reactor.

*7. The process of claim 6 in which the dehydrating and heat treating steps occur simultaneously.*

\* \* \* \* \*